United States Patent [19]

Greenlee, III

[11] Patent Number: 4,541,520
[45] Date of Patent: Sep. 17, 1985

[54] RIGHT ANGLE TRANSFER CONVEYOR SYSTEM AND A METHOD FOR TRANSFERRING ARTICLES AT A RIGHT ANGLE

[75] Inventor: Fred S. Greenlee, III, Wichita, Kans.

[73] Assignee: Great Plains Ventures, Wichita, Kans.

[21] Appl. No.: 535,633

[22] Filed: Sep. 26, 1983

[51] Int. Cl.$^4$ ............................................. B65G 47/46
[52] U.S. Cl. ................................... 198/372; 198/584; 198/598; 198/457
[58] Field of Search ............... 198/367, 372, 370, 789, 198/790, 781, 457, 787, 583, 584, 597, 598, 611

[56] References Cited

U.S. PATENT DOCUMENTS

| | | | |
|---|---|---|---|
| 1,939,891 | 12/1933 | Glahn et al. | 198/372 |
| 3,104,004 | 9/1963 | Poel et al. | 198/367 |
| 3,642,113 | 2/1972 | Burgis | 198/372 |
| 3,983,988 | 10/1976 | Maxted et al. | 198/367 |
| 4,319,675 | 3/1982 | Turnbough | 198/367 |

*Primary Examiner*—Joseph E. Valenza
*Assistant Examiner*—Kyle E. Shane
*Attorney, Agent, or Firm*—Edwin H. Crabtree

[57] ABSTRACT

A right angle transferring conveyor system comprising a right angle transfer assembly which includes a base, a pair of support plates connected to the base, and a plurality of rollers rotatably attached in proximity to the top of each of the support plates. A drive sheave is rotatably secured to each of the support plates at a situs on the same below the rollers. A pair of endless belts is trained over and carried by two sets of rollers and drive sheaves. A drive shaft is interconnected between the two drive sheaves to provide common rotary power for the two drive sheaves when the drive shaft receives the same. A first beveled gear is integrally bound to the drive shaft to aid in transmitting rotary power to the drive shaft means. A right angle power sheave is bound to one end of a power sheave shaft. The other end of the power sheave shaft terminates with a second beveled gear that meshes with the first beveled gear. A pneumatic assembly is provided for elevating the right angle transfer assembly. A process for transferring articles at a right angle preferably utilizes the conveyor system.

9 Claims, 8 Drawing Figures

RIGHT ANGLE TRANSFER CONVEYOR SYSTEM AND A METHOD FOR TRANSFERRING ARTICLES AT A RIGHT ANGLE

BACKGROUND OF THE INVENTION

1. Field of the Invention

This invention provides a right angle transferring conveyor system. More specifically, this invention contemplates a novel right angle transfer conveyor system for transferring articles at a right angle from a conveyor system, and a process for transferring articles at a right angle from the conveyor system.

2. Description of the Prior Art

U.S. Pat. No. 3,642,113 by Burgis discloses a right angle transfer arrangement wherein the transfer is effected by means of a plurality of rolls that may be engaged with and driven so as to effect a transfer of material on a conveyor in a direction perpendicular to the normal direction of travel. U.S. Pat. No. 3,782,527 by Petershack discloses a shift mechanism for a right angle transfer which includes a plurality of discs having a flattened portion thereon which allow engagement when rotated with the articles to be transferred in a direction perpendicular to their travel on the main conveyor. U.S. Pat. No. 3,104,004 by Poel, et al, teaches the conveyor transfer as being effected by means of a pair of spaced belts engagable with the articles carried on the main conveyor that may be shifted in a direction perpendicular to the normal direction of travel. None of the foregoing prior art teach or suggest the particular right angle transfer system and the process for transferring articles of this invention.

SUMMARY OF THE INVENTION

This invention accomplishes its desired objects by providing an improved combination of a right angle transferring conveyor system for transferring articles at a right angle from a conveyor system of the type having a plurality of carrier rollers rotatably connected to a pair of support members in a conveyor cable drive means mechanically communicating with the conveyor system including a plurality of idle sheaves rotatably connected underneath the carrier rollers to a plurality of support angle means having an adjustable means between each of the pressure angle means and the support angle means for vertically urging the pressure angle means away from the support angle means, and additionally having a nylon means covered endless cable positioned over the plurality of idle sheaves and engaged to the conveyor cable drive means and including at least two ends that are connected by a connection means. The unique right angle transferring conveyor system comprises a right angle transfer assembly means including a base means; a pair of support plate means connected to the base means; a plurality of roller means rotatably attached in proximity to the top, of each of the support plate means, and drive sheave means rotatably secured to each of the support plate means at a situs on the same below the roller means. A pair of endless belt means is provided with one being trained over and carried by one set of roller means and drive sheave means and the other endless belt means being trained over and carried by the second set of roller means and drive sheave means. A drive shaft means is interconnected to the two drive sheave means to provide common rotary power for the two drive sheave means when the drive shaft means receives rotary power. A first beveled gear means is integrally bound to the drive shaft means to aid in transmitting rotary power to the drive shaft means. A right angle power sheave means is bound to one end of a power sheave shaft means which has its other end bound with a second beveled gear means that meshes with the first beveled gear means of the drive shaft means. Attached to the base means is a means for elevating the right angle transfer assembly means such that initially the top of the roller means carrying the pair of endless belt means rises above the carrier rollers of the conveyor system to pick up any articles being carried by the same while simultaneously stopping all linear motion of the picked-up articles and subsequently, with continuing elevation, the power sheave means pinches the moving nylon means covered endless cable between itself and contiguous carrier rollers in order to extract frictionally power from the moving nylon means covered cable to rotatably drive the power sheave means which in turn indirectly transmits rotary power to the two drive sheave means which frictionally engages the two endless belt means to cause the same to traverse over the respective raised roller means in order to move any articles supported by the elevated endless belt means away from the conveyor system at a right angle. A process for transferring articles at a right angle from a conveyor system of the type having a plurality of carrier rollers rotatable connected to a pair of support members and a conveyor cable drive means mechanically communicating with the conveyor system to drive a nylon means covered endless cable comprising the steps of positioning underneath carrier rollers at a predetermined situs a right angle transfer assembly means having a pair of endless belt means engaged with and traveling over a pair of sets of a plurality of rotatable roller means and a rotatable drive sheave means which is indirectly rotatably driven by a power sheave means through a pair of meshing beveled gear means. The process additionally comprises elevating the right angle transfer assembly means such that initially the top of the roller means carrying the pair of endless belt means rises above the carrier rollers of the conveyor system to pick up any articles being carried by the same while simultaneously stopping all linear motion of the picked-up articles; and pinching the moving nylon means covered endless cable with the power sheave means against contiguous carrier rollers in order to extract frictionally power from the moving nylon means covered cable to rotatably drive the power sheave means which in turn indirectly transmits rotary power to the two drive sheave means that frictionally engages the two endless belt means to cause the same to traverse over the respective raised roller means in order to move any article supported by the elevated endless belt means away from the conveyor system at a right angle.

It is an object of the invention to provide a novel right angle transferring conveyor system which is capable of easily being assembled.

Still further objects of the invention reside in the provision of a novel right angle transferring conveyor system and a process for transferring articles at a right angle which is relatively easy to operate and is inexpensive to manufacture.

These together with the various ancillary objects and features will become apparent as the following description proceeds, are attained by this invention, preferred

DETAILED DESCRIPTION OF THE INVENTION

Figure 1:
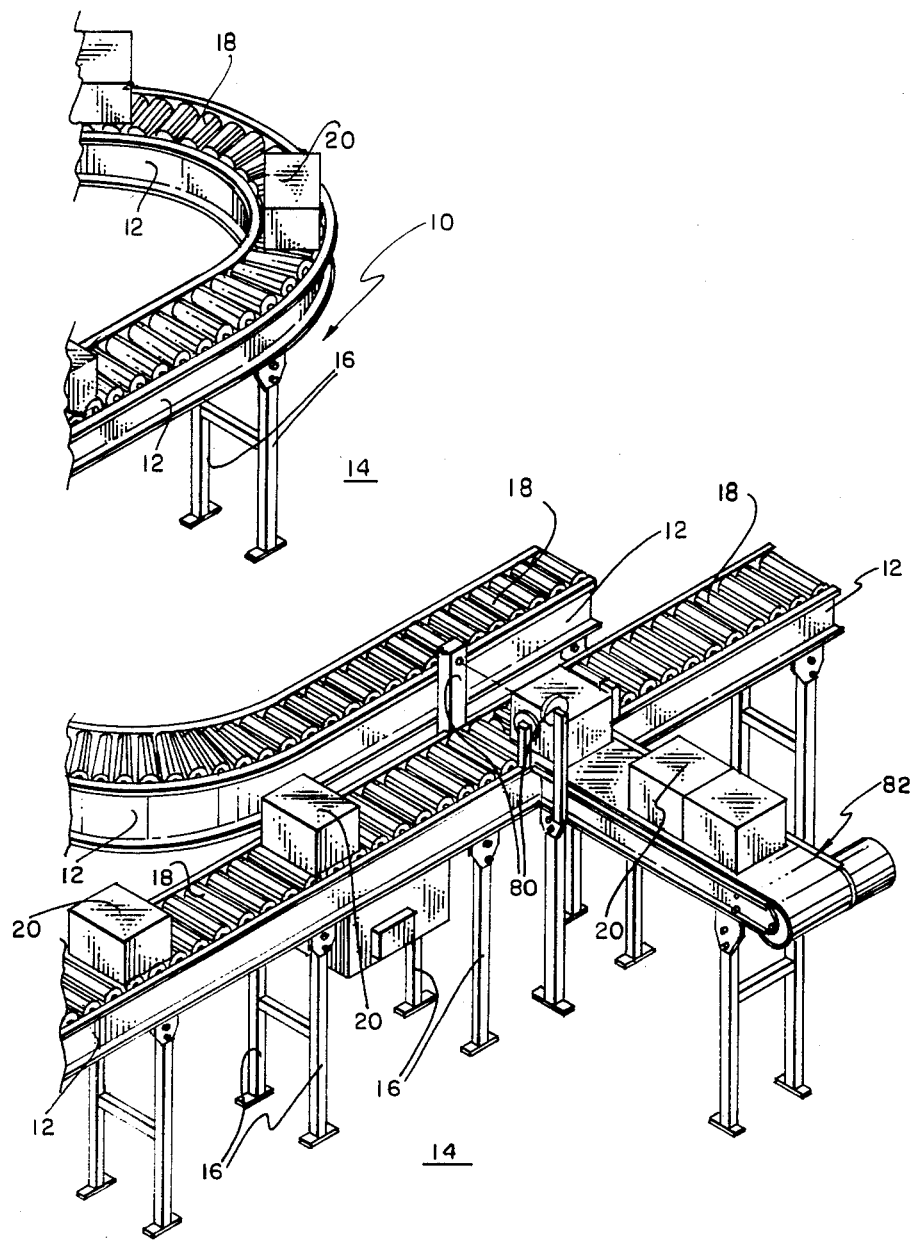
FIG. 1 is a perspective view of the invention.
Figure 2:
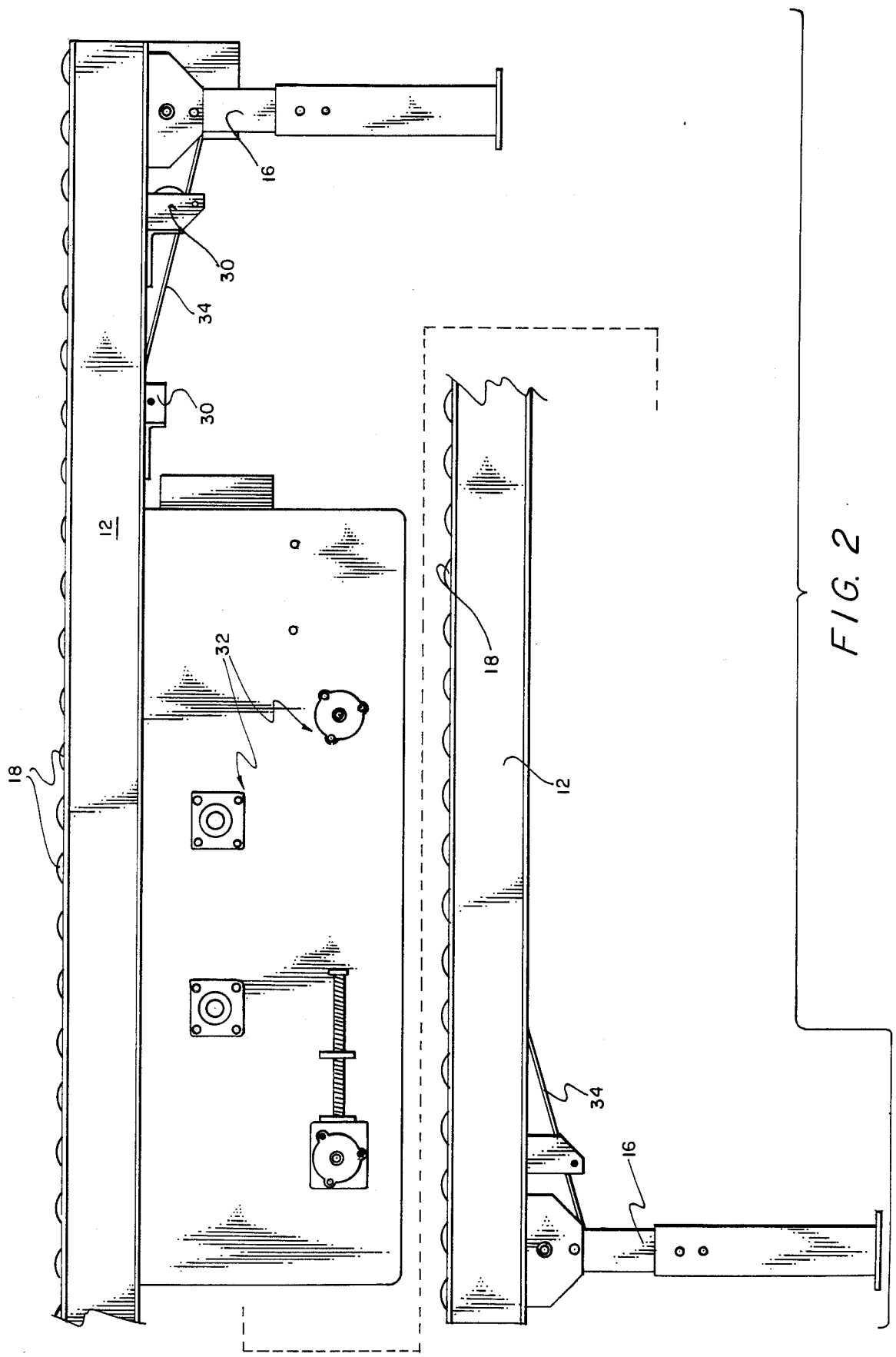
FIG. 2 is a segmented side elevational view of the straight section of the conveyor system with the power supply shown.

Referring in detail now to the drawings wherein similar parts of the invention are identified by like reference numerals, a cable drive conveyor system, generally illustrated as 10, has a pair of support members 12—12 generally equidistantly separated from each other throughout their lengths while serpentinely traversing a base floor 14. A plurality of pairs of supports 16—16 attach to the pair of support members 12—12 for supporting and positioning the conveyor system 10 at a desired height from the base floor 14. A plurality of carrier rollers 18 rotatably connected to the support members 12—12 for rotatably supporting and carrying articles 20. A plurality of sheave support members 22 (see FIG. 8) interconnect the pair of support members 12—12 underneath the carrier rollers 18.

Support angle means 24 connects to and is supported by the sheave support member 22. The support angle means 24 has a structure defining a plurality of angle apertures (not readily shown in the drawings). Pressure angle means 25 is in contact with and is slidably positioned over and against the support angle means 24. An attachment means (e.g. a bolt-nut 26) interconnects the support angle means 24 and the pressure angle means 25 within the angle apertures. A plurality of idler sheaves 28 rotatably attach to the pressure angle means 25. A return bracket means (not shown in the drawings) attach to selected sheave support members 22. A plurality of return sheaves 30 rotatably connect to the return bracket means (see FIG. 8): A means for vertically urging, generally illustrated as 31, the pressure angle means 25 away from the support angle means 24 while the attachment means 26 within the angle apertures slidably holds the pressure angle means 25 and the support angle means 24 together. The pressure angle means 25 has a structure defining a plurality of bolt apertures (not readily seen in the drawings) means, generally illustrated as 32, mechanically communicating with the conveyor system 10 to drive an endless cable 34 that is trained over and carried by the idler sheaves 28 and the return sheaves 30. Endless cable 34 is covered with a nylon means 36 (see FIG. 5). A cable connection means, generally illustrated as 38 in FIG. 5, connects two ends of the endless cable 34. The connection means 38 comprises a fork cable terminal means 40 secured to each end of the cable 34 that are to be joined. Cable center pivot means 42 is pivotally secured to each fork cable terminal means 40.

In a preferred embodiment of the invention, the means for vertically urging 31 comprises a plurality of bolt means 44 disposed through the bolt apertures. Spring bias means 46 surrounds the base of the bolt means 44 while being supported by the support angle means 24. A lock nut means 48 is rotatably secured to the bolt means 44 for compressing or releasing the spring bias means 46. A nut insert means 50 rotatably secured to the bolt means 44 and supports the pressure angle means 25. A nut means 52 is rotatable in the bolt means 44 and against the pressure angle means 25 such that the nut means 52 and the nut insert means 50 sandwich the pressure angle means 25 while retaining the same to the bolt means 44.

Figure 3:
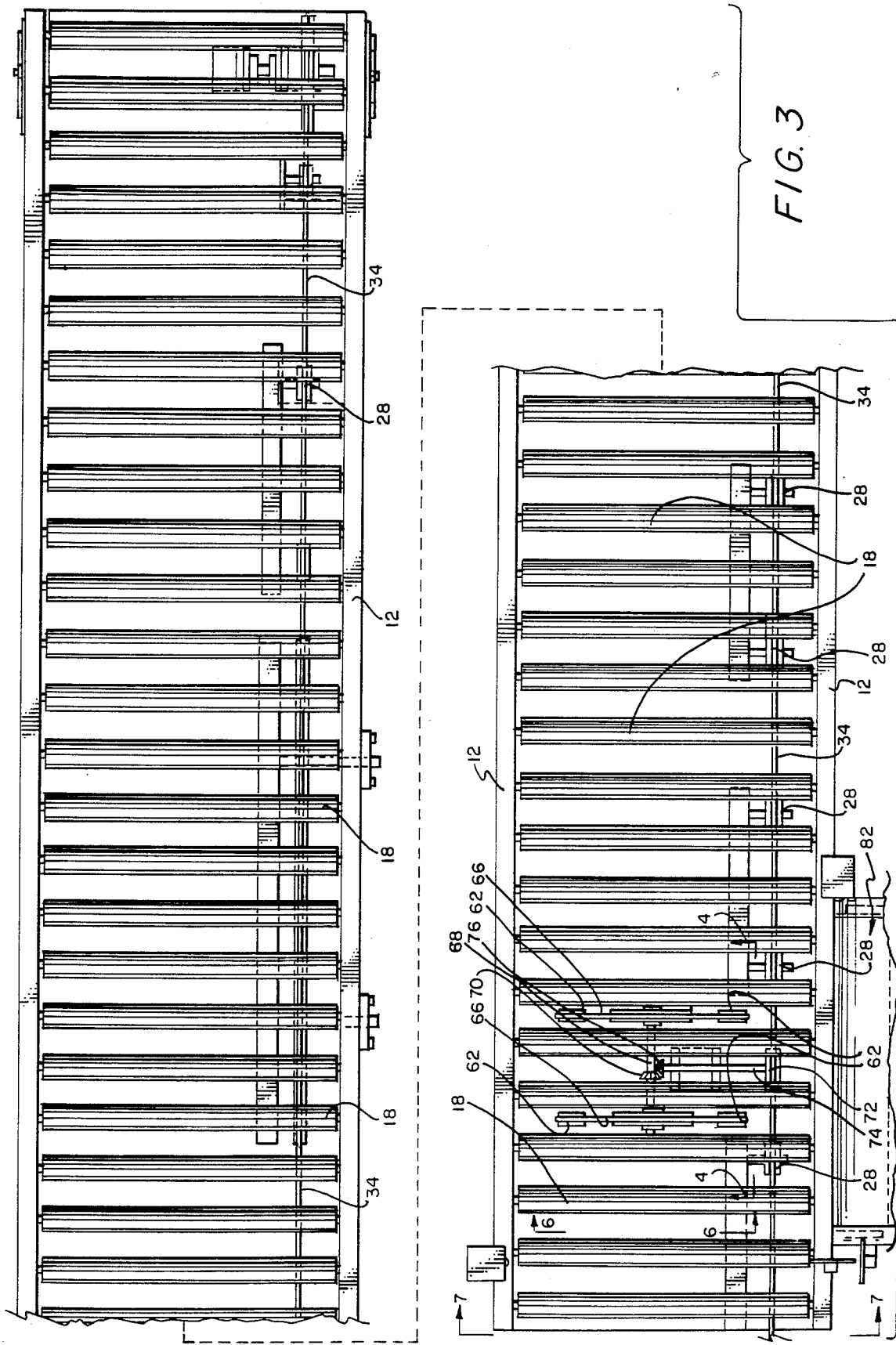
FIG. 3 is a top plan view of the straight section of the convenyor system showing drive and right angle drive mechanism.
Figure 4:
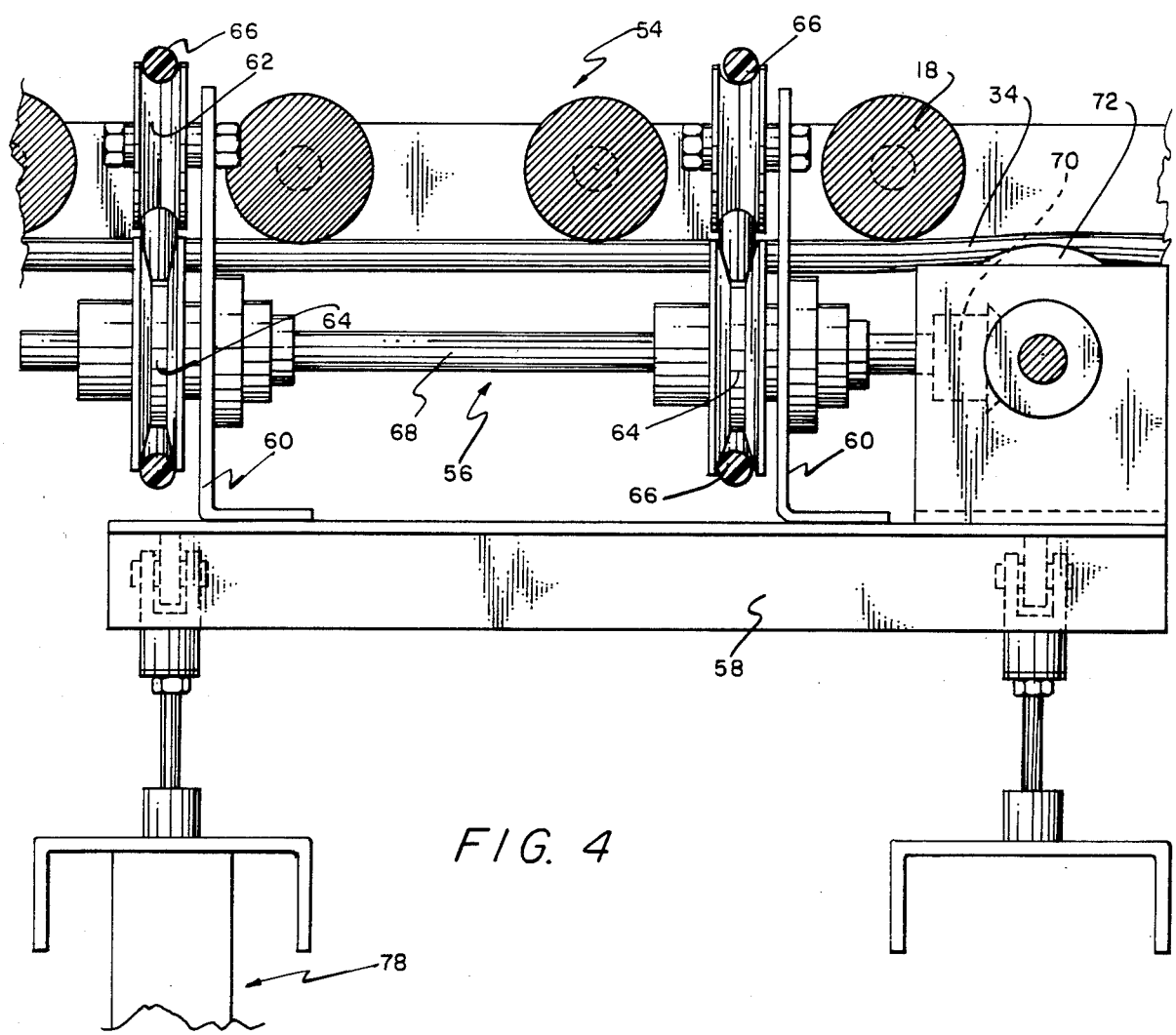
FIG. 4 is a vertical sectional view taken in direction of the arrows and along the plane of line 4—4 in FIG. 3.
Figure 5:
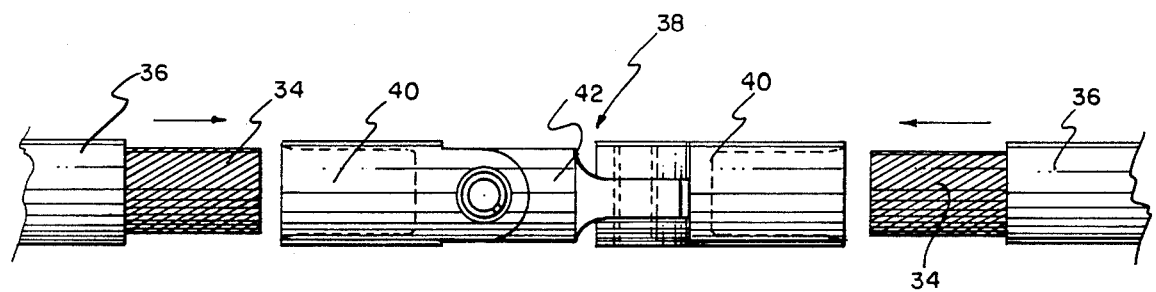
FIG. 5 is a view of the interconnecting drive cable and linkage.
Figure 6:
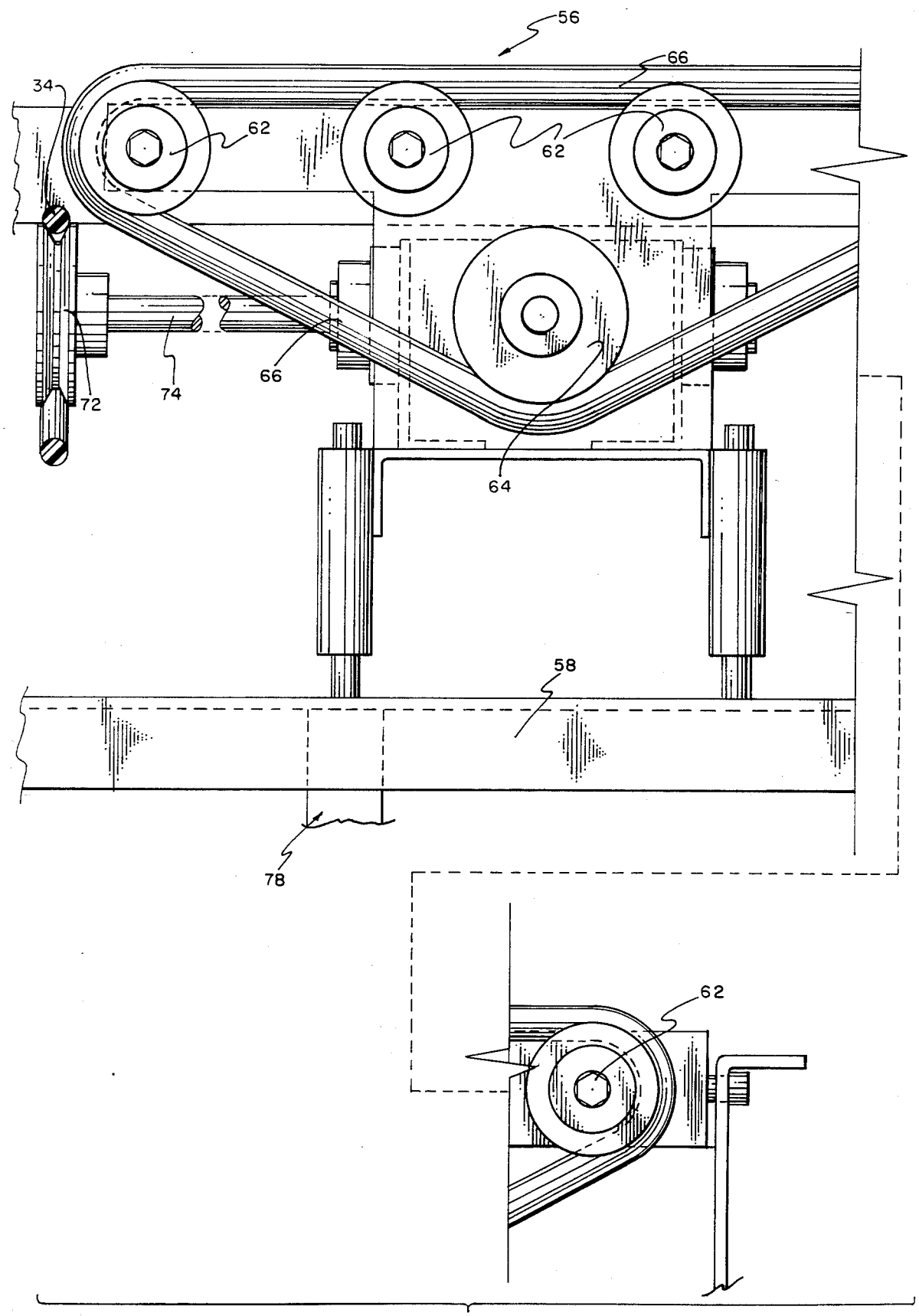
FIG. 6 is a vertical side elevational view taken in direction of the arrows and along the plane of line 6—6 in FIG. 3.
Figure 8:
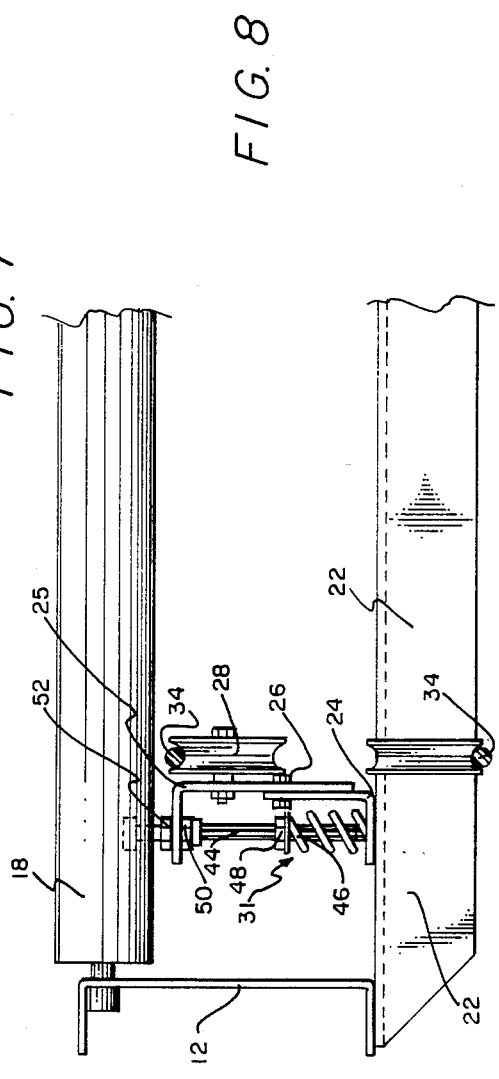
FIG. 8 is a partial elevational view of the main conveyor and wire cable assembly in disengaged position relative to right angled conveyor.

The right angle transferring conveyor system, generally illustrated as 54, of this invention comprises, in combination with the conveyor system 10, a right angle transfer assembly means, generally illustrated as 56 (see FIGS. 4, 6 and 8), including a base means 58; a pair of support plate means 60—60 connected to the base means 58: and a plurality of roller means 62—62—62—62 rotatably attached in proximity to the top of each of the support plate means 60—60. A pair of drive sheave means 64—64 is rotatably secured to the support plate means 60—60 at a situs on the same below the roller means 62. A pair of endless belt means 66—66 are trained over and carried by the roller means 62 and drive sheave means 64 as illustrated in FIGS. 4 and 5. A drive shaft means 68 interconnects the two drive sheave means 64—64 to provide common rotary power for the drive sheave means 64—64 when the shaft 68 receives rotary power. A first beveled gear means 70 is integrally bound to the shaft 68 to aid in the transmission of rotary power to the shaft 68. In one embodiment of the invention (see FIG. 3), beveled gear 70 is bound at the shaft 68 between the two drive sheave means 64—64. In another embodiment of the invention (see FIG. 4), beveled gear means 70 is bound to an end of the shaft 68 that extends beyond one of the drive sheave means 64. A right angle power sheave means 72 is bound to one end of a power sheave shaft means 74. The other end of the shaft means 74 (see FIG. 3) terminates into a beveled gear 76 that meshes with beveled gear 70 of shaft 68. A means for elevating, generally illustrated as 78 in FIGS. 4 and 8, the right angle transfer assembly 56 is mechanically engaged to the base 58. Means for elevating 78 is preferably either air cylinders or air bag drive, however, as one skilled in the art will know other means can be used, for example, electrical devices such as a linear actuator. When the means for elevating 78 is activated, as desired, (e.g. either manually, by signals such as pneumatic logic, bar code, laser beam scanners, etc., or by the electric eye means 80 in FIGS. 1 and 8) the top of the roller means 62 carrying the pair of endless belt means 66 rises, as illustrated in FIGS. 4, 6 and 8, above the carrier rollers 18 of the conveyor system 10 to pick up any article 20 being carried by the rollers 18 while simultaneously stopping all linear motion of the picked-up articles. Subsequently, with continuing elevation of the right angle transfer assembly 56 by the means for elevating 78, the power sheave means 64 is pinched by the nylon means covered endless cable 34 (see FIG. 4) between itself and contiguous carrier rollers 18 in order to extract frictionally power from the moving nylon means covered cable 34 to rotatively drive the power sheave means 64 which in turn indirectly transmits rotary power to the two drive sheave means 64—64 which frictionally engage the two endless belt means 66—66 to cause the same to traverse over the respective raised roller means 62 in order to move any articles 20 supported by the endless belt means 66—66 away from the conveyor system 10 at a right angle onto an auxiliary portable conveyor, generally illustrated as 80 in FIGS. 1 and 8, to be conveyed away. The right angle transferring conveyor system 54 of this invention is capable of transferring the articles 20 from the conveyor system 10 at a right angle in the opposite direction from that illustrated in the drawings by engaging beveled gear 70 (see FIG. 3) from the opposite direction with beveled gear 76.

Figure 7:
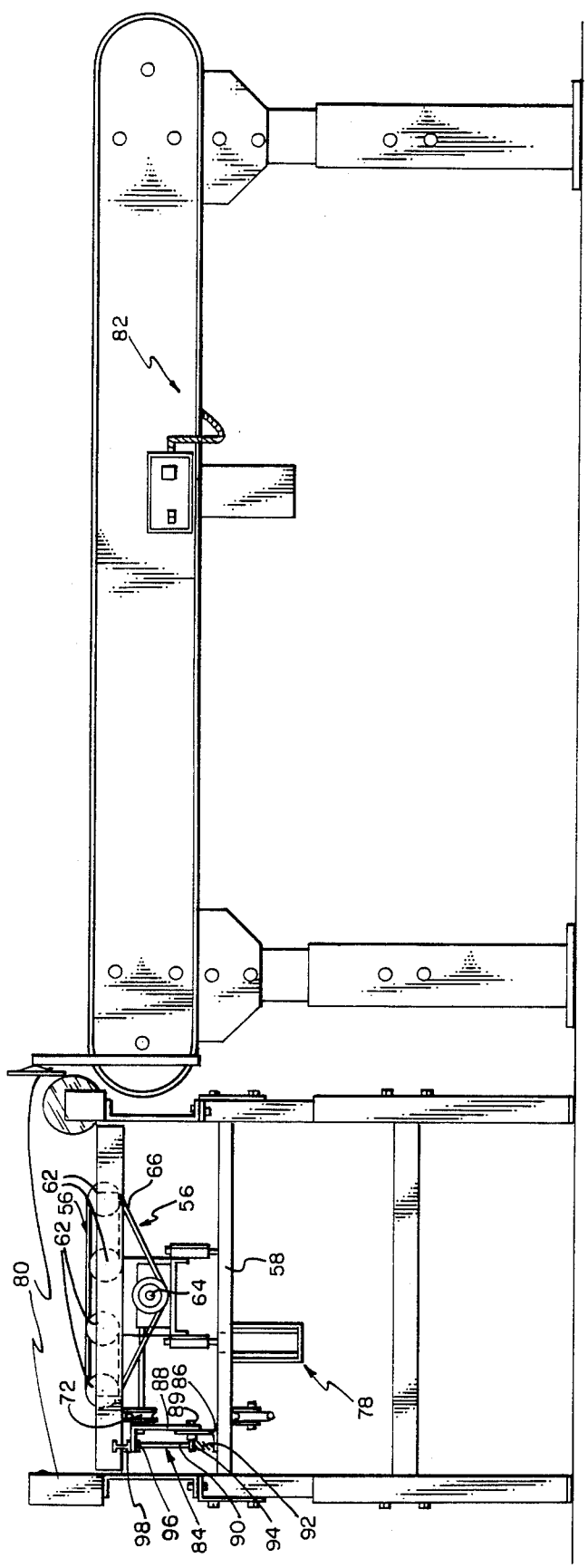
FIG. 7 is a vertical side elevational view taken in direction of the arrows and along the plane of line 7—7 in FIG. 3, and shows the main conveyor engaged and in delivery position relative to the right angle conveyor.

Another embodiment of this invention is a means for mounting, generally illustrated as 84 in FIG. 7, for maintaining the power sheave 72 in constant pressure against the endless cable 34 while the same is pinched between the corner roller 18 and the power sheave means 72. The means for maintaining 84 includes a power support angle means 86 connected to and supported by the base means 58. The power support angle 86 has a structure defining a plurality of power angle apertures. A power pressure angle means 88 having power bolt aperture is in contact with and slidably positioned over and against the power support angle means 86. A power attachment means 89 (e.g. a bolt-nut combination) interconnects the power support angle 86 and the power pressure angle 88 within the power angle apertures. The power sheave 72 is rotatably connected to the power pressure angle 88. A power bolt 90 is disposed through the power bolt aperture. A power spring biasing means 92 surrounds the base of the power bolt 90 and is supported by the power support angle 88. A power lock nut 94 is rotatably secured to the power bolt 90 for compressing or releasing the power spring biasing means 92. A power nut insert means 96 is rotatably secured to the power bolt 90 and supports the power pressure angle means 88. A power nut means 98 is rotatable on the power bolt means 90 and against the power pressure angle means 88 such that the power nut means 98 and the power nut sert means 96 sandwich the power pressure angle means 88 while retaining same to the power bolt means 90.

The right angle transferring conveyor system 54 extracts power directly from the passing nylon means covered cable 34 rather than requiring its own drive motor. When activated means for elevating 78 (air cylinders or air bag drive) drive the entire transfer assembly 56 upward. The belt means 66—66 rise above the surface of the carrier rollers 18 picking up any article 20 above them. This provides the unique feature of stopping all linear motion of the article 20 prior to the right angle transfer. Stopping linear motion in one direction before applying force in another direction is important in that the article 20 will transfer without the problem of "package sheaving" as is characteristic of other right angle transfer mechanisms. Further upward travel of the transfer assembly 56 causes the power sheave 72 to pinch the traveling drive cable 34 between itself and two carrier rollers 18—18 of the conveyor system 10. This pinching action extracts power from the cable 34 rotating the assembly's power sheave 72 into the set of gears 70, 76 and sheave 64—64 which drive the endless belt means 66—66 and article 20 off of the conveyor system 10 at a right angle. Another unique feature of this invention is that the transfer has the capability to drive in either direction simply by engaging the gear 70 from the opposite direction with another gear, either manually or with a switch. The transfer system 54 extracts power from the cable 34 only when needed. When inactive the assembly 56 falls below the carrier rollers 18 and uses no power.

Various alterations may be made in the foregoing constructions without departing from the scope of the invention, and it is intended that the drawings and embodiments of the invention are to be merely illustrative.

I claim:

1. In an improved combination of a right angle transferring conveyor system for transferring articles at a right angle from a conveyor system of the type having a plurality of carrier rollers rotatably connected to a pair of support members and a conveyor cable drive means mechanically communicating with the conveyor system including a plurality of idle sheaves rotatably connected underneath the corner rollers to a plurality of pressure angle means that are in slidable contact with a plurality of support angles means having an adjustable means between each of the pressure angles means and the support angles means for vertically urging the pressure angle means away from the support angle means, and additionally having a nylon means covered endless cable positioned over the plurality of idle sheaves and engaged to the conveyor cable drive means and including at least two ends that are connected by a connection means, said improvement having the right angle transferring conveyor system comprising: a right angle transfer assembly means including a base means; a pair of support plate means connected to the base means: a plurality of roller means rotatably attached in proximity to the top of each of the support plate means; drive sheave means rotatably secured to each of the support plate means at a situs on the same below said roller means; a pair of endless belt means, one being trained over and carried by one set of roller means and drive sheave means and the other endless belt means being trained over and carried by the second set of roller means and drive sheave means; a drive shaft means interconnected to the two drive sheave means to provide common rotary power for the two drive sheave means when the drive shaft means receives rotary power: a first beveled gear means integrally bound to said drive shaft means to aid in transmitting rotary power to the drive shaft means: a right angle power sheave means; a power sheave shaft means having one end bound to the power sheave means and the other end bound with a secured beveled gear means that meshes with the first beveled gear means of the drive shaft means; and means for elevating the right angle transfer assembly means such that initially the top of the roller means carrying the pair of endless belt means rises above the corner rollers of the conveyor system to pick up any articles being carried by the same while simultaneously stopping all linear motion of the picked-up articles and subsequently with continuing elevation the power sheave means pinches the moving nylon means covered endless cable between itself and contiguous carrier rollers in order to extract frictionally power from the moving nylon means covered cable to rotatively drive the power sheave means which in turn indirectly transmits rotary power to the two drive sheave means which frictionally engages the two endless belt means to cause the same to traverse over the respective raised roller means in order to move any articles supported by the elevated endless belt means away from the conveyor system at a right angle.

2. The improved combination of claim 1 wherein said first beveled gear means is bound to said drive shaft means between the two drive sheave means.

3. The improved combination of claim 1 wherein said first beveled gear means is bound to an end of said drive shaft means that extends beyond one of said drive sheave means.

4. The improved combination of claim 1 wherein said connection means comprises a fork cable terminal means secured to each end of the cables that are joined; a cable center pivot means pivotally secured to each fork cable terminal means.

5. The improved combination of claim 1 wherein said means for elevating comprises a pneumatic driven means.

6. The improved combination of claim 1 additionally comprising a means for maintaining the power sheave means in constant pressure against the endless cable means while the same is pinched between the carrier roller and the power sheave means.

7. The improved combination of claim 6 wherein said means for maintaining comprises a power support angle means connected to and supported by the base means, said power support angle means having a structure defining a plurality of power angle apertures: a power pressure angle means having a power bolt aperture and in contact with and slidably positioned over and against the power support angle means: a power attachment means interconnecting said power support angle means and the power pressure angle means within the power angle aperture; said power sheave means is rotatably connected to said power pressure angle means: a power bolt means is disposed through the power bolt aperture; a power spring biasing means surrounding the base of the power bolt and supported by the power support angle; a power lock nut means rotatably secured to the power bolt for compressing or releasing the power spring biasing means; a power nut insert means rotatably secured to the power bolt and supporting the power pressure angle means; and a power nut means rotatable on the power bolt means and against the power pressure angle means such that the power nut means and the power nut insert means sandwich the power pressure angle means while retaining the same to the power bolt means.

8. A process for transferring articles at a right angle from a conveyor system of the type having a plurality of carrier rollers rotatably connected to a pair of support members and a conveyor cable drive mean mechanically communicating with the conveyor system to drive a nylon means covered endless cable comprising the steps of:
 (a) positioning underneath carrier rollers at a predetermined situs a right angle transfer assembly means having a pair of endless belt means engaged with and traveling over a pair of sets of a plurality of rotatable roller means and a rotatable drive sheave means which is indirectly rotatively driven by a power sheave means through a pair of meshing beveled gear means;
 (b) elevating the right angle transfer assembly means such that initially the top of the roller means carrying the pair of endless belt means rises above the carrier rollers of the conveyor system to pick up any articles being carried by the same while simultaneously stopping all linear motion of the picked-up articles;
 (c) pinching the moving nylon means covered endless cable with the power sheave means against contiguous carrier rollers in order to extract frictionally power from the moving nylon means covered cable to rotatively drive the power sheave means which in turn indirectly transmits rotary power to the two drive sheave means which frictionally engages the two endless belt means to cause the same to traverse over the respective raised roller means in order to move any articles supported by the elevated endless belt means away from the conveyor system at a right angle.

9. The process of claim 8 additionally comprising transferring the articles from the conveyor system at a right angle in an opposite direction from that of step (c).

* * * * *